United States Patent
Kato et al.

(10) Patent No.: US 10,723,199 B2
(45) Date of Patent: Jul. 28, 2020

(54) VEHICULAR HEAT MANAGEMENT DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yoshiki Kato, Kariya (JP); Masayuki Takeuchi, Kariya (JP); Keigo Sato, Kariya (JP); Koji Miura, Kariya (JP); Norihiko Enomoto, Kariya (JP); Kengo Sugimura, Kariya (JP); Ariel Marasigan, Kariya (JP); Ikuo Ozawa, Kariya (JP); Nobuharu Kakehashi, Kariya (JP); Yoshikazu Shinpo, Nisshin (JP); Yoichi Onishi, Okazaki (JP); Toshio Murata, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 196 days.

(21) Appl. No.: 15/763,503

(22) PCT Filed: Sep. 6, 2016

(86) PCT No.: PCT/JP2016/076076
§ 371 (c)(1),
(2) Date: Mar. 27, 2018

(87) PCT Pub. No.: WO2017/056867
PCT Pub. Date: Apr. 6, 2017

(65) Prior Publication Data
US 2018/0272839 A1 Sep. 27, 2018

(30) Foreign Application Priority Data
Oct. 2, 2015 (JP) ................. 2015-196666

(51) Int. Cl.
*B60H 1/00* (2006.01)
*B60H 1/03* (2006.01)
(Continued)

(52) U.S. Cl.
CPC .......... *B60H 1/00885* (2013.01); *B60H 1/00* (2013.01); *B60H 1/00892* (2013.01); *B60H 1/03* (2013.01); *B60H 1/08* (2013.01); *B60H 1/22* (2013.01)

(58) Field of Classification Search
CPC ............ B60H 1/00885; B60H 1/00892; B60H 2001/00928; F01P 2060/08
See application file for complete search history.

(56) References Cited

U.S. PATENT DOCUMENTS

| | | | |
|---|---|---|---|
| 5,421,169 A | 6/1995 | Benedict | |
| 2003/0046945 A1* | 3/2003 | Heyl | B60H 1/00907 62/238.7 |

(Continued)

FOREIGN PATENT DOCUMENTS

| | | |
|---|---|---|
| JP | H06219150 A | 8/1994 |
| JP | 2004-131058 A | 4/2004 |

(Continued)

*Primary Examiner* — Eric S Ruppert
(74) *Attorney, Agent, or Firm* — Harness, Dickey & Pierce, P.L.C.

(57) ABSTRACT

A vehicular heat management device includes a first heat source, a second heat source, a heater core, a first heat medium pathway, a second heat medium pathway, a heater core pathway, a switching portion, and a control unit. The first heat source is provided in the first heat medium pathway, and the second heat source is provided in the second heat medium pathway. The heater core is provided in the heater core pathway. The switching portion switches between flowing connection and flowing disconnection. The control unit performs at least one of a switching control and a second heat source control when a temperature of the heat (Continued)

medium of the heater core pathway is at or above a predetermined temperature. In the switching control, the switching portion connects the second heat medium pathway to the heater core pathway. In the second heat source control, the second heat source generates heat.

11 Claims, 7 Drawing Sheets

(51) Int. Cl.
*B60H 1/08* (2006.01)
*B60H 1/22* (2006.01)

(56) References Cited

U.S. PATENT DOCUMENTS

2004/0060316 A1    4/2004   Ito et al.
2016/0031288 A1    2/2016   Nishikawa et al.

FOREIGN PATENT DOCUMENTS

JP      2007283830 A    11/2007
JP      2014-218237 A    11/2014

\* cited by examiner

VEHICULAR HEAT MANAGEMENT DEVICE

CROSS REFERENCE TO RELATED APPLICATIONS

This application is a U.S. National Phase Application under 35 U.S.C. 371 of International Application No. PCT/JP2016/076076 filed on Sep. 6, 2016 and published in Japanese as WO 2017/056867 A1 on Apr. 6, 2017. This application is based on and claims the benefit of priority from Japanese Patent Application No. 2015-196666 filed on Oct. 2, 2015. The entire disclosures of all of the above applications are incorporated herein by reference.

TECHNICAL FIELD

The present disclosure relates to a heat management device for a vehicle.

BACKGROUND ART

Conventionally, Patent Document 1 discloses a vehicular air conditioning device that heats a vehicle compartment by heat dissipated from a heater core. The heater core heats the vehicle compartment by using a coolant heated by heat dissipated from an engine.

In this conventional technology, the coolant can be heated by a water-refrigerant heat exchanger as well as the engine. The water-refrigerant heat exchanger is a heat exchanger that heats the cooling water of the engine by using a refrigeration cycle.

According to this, the cooling water can be heated by heat dissipated from the water-refrigerant heat exchanger to heat the vehicle compartment even when the heat dissipation amount of the engine is small.

PRIOR ART DOCUMENT

Patent Document

Patent Document 1: JP 2007-283830 A

SUMMARY OF THE INVENTION

In the above-described technology, the engine is a first heat source that heats the coolant as a heat medium, and the water-refrigerant heat exchanger is a second heat source that heats the coolant as the heat medium.

In configurations in which a pathway connected to the heater core can be switched between a first heat medium pathway in which the first heat source is provided and a second heat medium pathway in which the second heat source is provided, when a temperature difference of the heat medium between the first heat medium pathway and the second heat medium pathway is large, the temperature of the heat medium flowing into the heater core changes at a time when the heat medium pathway connected to the heater core is switched. Consequently, a temperature of air flowing through the heater core may change, and comfort of occupants may decrease.

In consideration of the above-described points, it is an objective of the present disclosure to limit a temperature change of a heat medium flowing into a heater core at a time when a heat medium pathway connected to the heater core is switched.

A vehicular heat management device according to a first aspect of the present disclosure includes a first heat source, a second heat source, a heater core, a first heat medium pathway, a second heat medium pathway, a heater core pathway, a switching portion, and a control unit. The first heat source heats a heat medium by a waste heat generated according to operation of the first heat source. The second heat source heats the heat medium, and an amount of heat generation of the second heat source can be controlled as desired. The heater core heats an air sent to a vehicle compartment by exchanging heat between the heat medium and the air. The heat medium flows through the first heat medium pathway, and the first heat source is provided in the first heat medium pathway. The heat medium flows through a second heat medium pathway, and the second heat source is provided in the second heat medium pathway. The heat medium flows through a heater core pathway, and the heater core is provided in the heater core pathway. The switching portion switches between flowing connection and flowing disconnection between the first heat medium pathway and the heater core pathway, and switches between flowing connection and flowing disconnection between the second heat medium pathway and the heater core pathway. The control unit performs at least one of a switching control and a second heat source control to increase a temperature of the heat medium of the second heat medium pathway to be higher than a temperature of an outside air when a temperature of the heat medium of the heater core pathway is at or above a predetermined temperature. In the switching control, the control unit controls an operation of the switching portion such that the second heat medium pathway communicates with the heater core pathway. In the second heat source control, the control unit makes the second heat source generate heat.

According to this, when the temperature of the heat medium in the heater core pathway is high, the temperature of the heat medium in the second heat medium pathway can be increased at least one of the heat medium in the heater core pathway and a heat generated by the second heat source.

Accordingly, since a temperature difference between the heat medium in the heater core pathway and the heat medium in the second heat medium pathway can be reduced, a temperature change of the heat medium flowing into the heater core when the second heat medium pathway is connected to the heater core pathway can be limited.

A vehicular heat management device according to a second aspect of the present disclosure includes a first heat source, a second heat source, a heater core, a first heat medium pathway, a second heat medium pathway, a heater core pathway, a switching portion, and a control unit. The first heat source heats a heat medium by a waste heat generated according to operation of the first heat source. The second heat source heats the heat medium, and an amount of heat generation of the second heat source can be controlled as desired. The heater core heats an air sent to a vehicle compartment by exchanging heat between the heat medium and the air. The heat medium flows through the first heat medium pathway, and the first heat source is provided in the first heat medium pathway. The heat medium flows through a second heat medium pathway, and the second heat source is provided in the second heat medium pathway. The heat medium flows through a heater core pathway, and the heater core is provided in the heater core pathway. The switching portion switches between flowing connection and flowing disconnection between the first heat medium pathway and the heater core pathway, and switches between flowing connection and flowing disconnection between the second heat medium pathway and the heater core pathway. When a temperature of the heat medium in the heater core pathway is at or above a predetermined temperature, and a temperature of the heat medium in the first heat medium pathway is below the predetermined temperature, the control unit controls an operation of the switching portion such that the first heat medium pathway is connected to the heater core pathway to increase the temperature of the heat medium of the first heat medium pathway.

According to this, when the temperature of the heat medium in the heater core pathway is high, and the temperature of the heat medium in the first heat medium pathway is low, the temperature of the heat medium in the first heat medium pathway can be increased by the heat medium in the heater core pathway.

Accordingly, since a temperature difference between the heat medium in the heater core pathway and the heat medium in the first heat medium pathway can be reduced, a temperature change of the heat medium flowing into the heater core when the first heat medium pathway is connected to the heater core pathway can be limited.

A vehicular heat management device according to a third aspect of the present disclosure includes a first heat source, a second heat source, a heater core, a first heat medium pathway, a second heat medium pathway, a heater core pathway, a switching portion, and a control unit. The first heat source heats a heat medium by a waste heat generated according to operation of the first heat source. The second heat source heats the heat medium, and an amount of heat generation of the second heat source can be controlled as desired. The heater core heats an air sent to a vehicle compartment by exchanging heat between the heat medium and the air. The heat medium flows through the first heat medium pathway, and the first heat source is provided in the first heat medium pathway. The heat medium flows through a second heat medium pathway, and the second heat source is provided in the second heat medium pathway. The heat medium flows through a heater core pathway, and the heater core is provided in the heater core pathway. The switching portion switches between flowing connection and flowing disconnection between the first heat medium pathway and the heater core pathway, and switches between flowing connection and flowing disconnection between the second heat medium pathway and the heater core pathway. When a temperature of the heat medium of the first heat medium pathway is at or above a predetermined temperature, the control unit performs at least one of a switching control and a second heat source control to increase a temperature of the heat medium of the second heat medium pathway to be higher than a temperature of an outside air. In the switching control, the control unit controls an operation of the switching portion such that the second heat medium pathway communicates with the first heat medium pathway. In the second heat source control, the control unit makes the second heat source generate heat.

According to this, when the temperature of the heat medium in the first heat medium pathway is high, the temperature of the heat medium in the second heat medium pathway can be increased by at least one of the heat medium in the first heat medium pathway and heat generated by the second heat source.

Accordingly, since the temperature difference between the heat medium in the first heat medium pathway and the heat medium in the second heat medium pathway can be reduced, a temperature change of the heat medium flowing into the heater core when the heat medium pathway connected to the heater core pathway is switched can be limited.

A vehicular heat management device according to a fourth aspect of the present disclosure includes a first heat source, a second heat source, a heater core, a first heat medium pathway, a second heat medium pathway, a heater core pathway, a switching portion, and a control unit. The first heat source heats a heat medium by a waste heat generated according to operation of the first heat source. The second heat source heats the heat medium, and an amount of heat generation of the second heat source can be controlled as desired. The heater core heats an air sent to a vehicle compartment by exchanging heat between the heat medium and the air. The heat medium flows through the first heat medium pathway, and the first heat source is provided in the first heat medium pathway. The heat medium flows through a second heat medium pathway, and the second heat source is provided in the second heat medium pathway. The heat medium flows through a heater core pathway, and the heater core is provided in the heater core pathway. The switching portion switches between flowing connection and flowing disconnection between the first heat medium pathway and the heater core pathway, and switches between flowing connection and flowing disconnection between the second heat medium pathway and the heater core pathway. When a temperature of the heat medium in the second heat medium pathway is at or above a predetermined temperature, and a temperature of the heat medium in the first heat medium pathway is below the predetermined temperature, the control unit controls an operation of the switching portion such that the first heat medium pathway is connected to the second heat medium pathway to increase the temperature of the heat medium of the first heat medium pathway.

According to this, when the temperature of the heat medium in the second heat medium pathway is high, and the temperature of the heat medium in the first heat medium pathway is low, the temperature of the heat medium in the first heat medium pathway can be increased by the heat medium in the second heat medium pathway.

Accordingly, since the temperature difference between the heat medium in the second heat medium pathway and the heat medium in the first heat medium pathway can be reduced, the temperature change of the heat medium flowing into the heater core when the heat medium pathway connected to the heater core pathway is switched can be limited.

EMBODIMENTS FOR EXPLOITATION OF THE INVENTION

Figure 1:
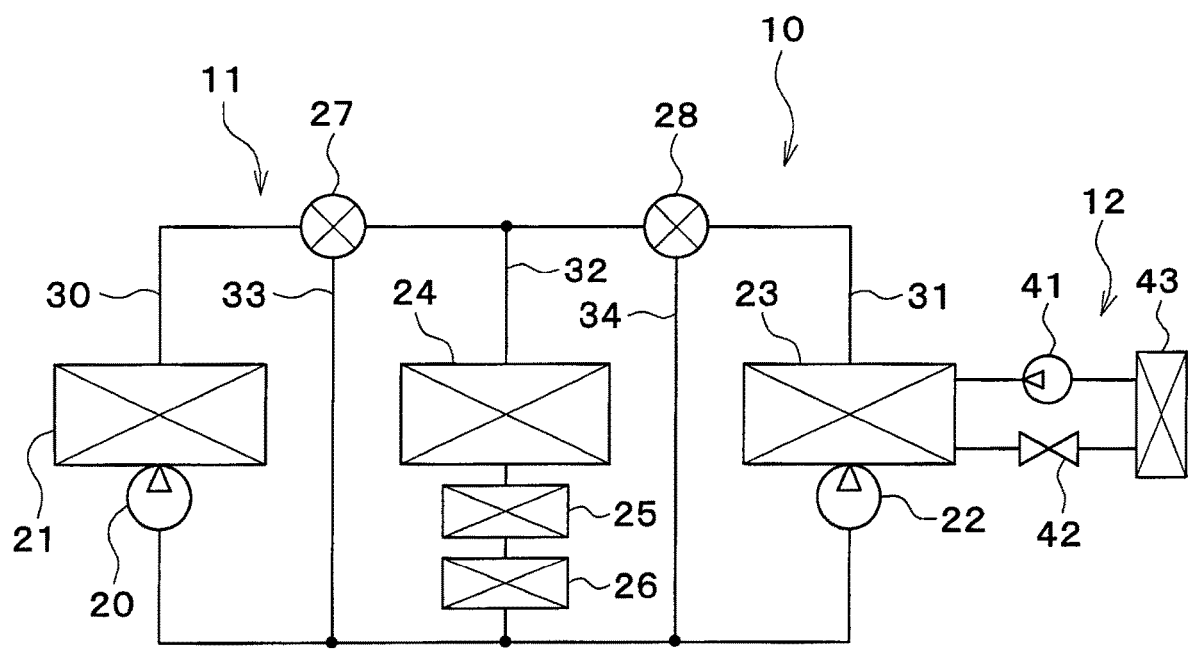
FIG. 1 is a diagram illustrating a vehicular heat management device according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

Embodiments will be described below with reference to the drawings. In the respective embodiments, a part that corresponds to a matter described in a preceding embodiment may be assigned the same reference numeral in the drawings.

First Embodiment

A vehicular heat management device 10 shown in FIG. 1 is used to adjust temperature of various devices mounted on a vehicle or a vehicle compartment to be appropriate.

In the present embodiment, the vehicular heat management device 10 is applied to a hybrid vehicle that can obtain a vehicle-travel driving force from both an engine and a traveling electric motor.

The hybrid vehicle in this embodiment is configured as a plug-in hybrid vehicle that is capable of charging the battery mounted on the vehicle, with power supplied from an external power source while the vehicle is parked. For example, a lithium ion battery can be used as the battery.

The driving force output from the engine is used not only to cause the vehicle to travel, but also to operate a power generator. The power generated by the power generator and the power supplied from an external power source can be stored in the battery. The power stored in the battery is supplied not only to the traveling electric motor, but also to various vehicle-mounted devices, including electric components constituting the vehicular heat management device 10.

The vehicular heat management device 10 includes a coolant circuit 11 and a refrigeration cycle 12. A coolant circulates in the coolant circuit 11. The refrigeration cycle is a vapor-compression refrigerator.

The coolant is a fluid as a heat medium. For example, the coolant suitable for use may be a liquid containing at least ethylene glycol, polydimethylsiloxane or nanoparticles, or an antifreezing fluid. The coolant circuit 11 is a heat medium circuit in which the heat medium circulates.

The coolant circuit 11 includes an engine pump 20, an engine 21, a condenser pump 22, a condenser 23, a heater core 24, an EGR cooler 25, an exhaust gas heat recovery unit 26, an engine side switching valve 27, and a condenser side switching valve 28.

The engine pump 20 is an electric pump that draws and discharges the coolant. The engine pump 20 may be a belt driven pump that is driven by a driving force transmitted from the engine 21 through a belt.

The engine 21 is a first heat source that heats the coolant by a waste heat generated according to operation of the engine 21. The engine pump 20 and the engine 21 are arranged in series in an engine pathway 30. The engine pathway 30 constitutes a flow passage through which the coolant flows. The engine pathway 30 is a first heat medium pathway in which the engine 21 that is the first heat source is provided.

The condenser pump 22 is an electric pump that draws and discharges the coolant. The condenser pump 22 may be a belt driven pump that is driven by a driving force transmitted from the engine 21 through a belt.

The condenser 23 is a high-pressure side heat exchanger that heats the coolant by exchanging heat between the coolant and a high-pressure side refrigerant of the refrigeration cycle 12. The condenser 23 is capable of controlling the amount of its heat generation and is a second heat source that heats the coolant. The condenser pump 22 and the condenser 23 are arranged in series in the condenser pathway 31. The condenser pathway 31 constitutes a flow passage in which the coolant flows. The condenser pathway 31 is a second heat medium pathway in which the condenser 23 that is the second heat source is provided.

The heater core 24 is an air heating heat exchanger that exchanges heat between the coolant and the air sent to a vehicle compartment to heat the sent air. The heater core 24 is a heat exchanger used for heating the vehicle compartment.

The EGR cooler 25 and the exhaust gas heat recovery unit 26 are vehicular heat generator that are mounted on a vehicle and generate heat. The EGR cooler 25 is a heat exchanger that exchanges heat between an exhaust gas returning to an intake side of the engine 21 and the coolant to cool the exhaust gas. The exhaust gas heat recovery unit 26 is a heat exchanger that exchanges heat between the exhaust gas of the engine 21 and the coolant to recover the heat of the exhaust gas.

The heater core 24, the EGR cooler 25, and the exhaust gas heat recovery unit 26 are arranged in series in the heater core pathway 32. The heater core pathway 32 constitutes a flow passage in which the coolant flows. The EGR cooler 25 and the exhaust gas heat recovery unit 26 are located in the heater core pathway 32 and downstream of the heater core 24 with respect to a flow of the coolant.

The heater core pathway 32 communicates with the engine pathway 30 and an engine side bypass pathway 33 through the engine side switching valve 27. The engine side bypass pathway 33 is connected to the engine pathway 30 in parallel with the heater core pathway 32.

The heater core pathway 32 communicates with the condenser pathway 31 and a condenser side bypass pathway 34 through the condenser side switching valve 28. The condenser side bypass pathway 34 is connected to the condenser pathway 31 in parallel with the heater core pathway 32.

The engine side switching valve 27 and the condenser side switching valve 28 are switching portions that switch a flow of the coolant. The engine side switching valve 27 and the condenser side switching valve 28 are the switching portions that switch between flowing connection and flowing disconnection between the engine pathway 30 and the heater core pathway 32, and switch between flowing connection and flowing disconnection between the condenser pathway 31 and the heater core pathway 32.

The engine side switching valve 27 switches between flowing connection and flowing disconnection between the engine pathway 30, the heater core pathway 32, and the engine side bypass pathway 33. The condenser side switching valve 28 switches between flowing connection and flowing disconnection between the condenser pathway 31, the heater core pathway 32, and the condenser side bypass pathway 34. The flowing connection may mean a condition where pathways are connected such that a fluid flows between pathways. The flowing disconnection may mean a condition where the flow of the fluid is stopped such that the fluid does not flow between pathways.

The refrigeration cycle 12 includes a compressor 41, the condenser 23, an expansion valve 42, and an evaporator 43. The refrigerant used in the refrigeration cycle 12 is a chlorofluorocarbon refrigerant. The refrigeration cycle 12 is a subcritical refrigeration cycle in which a high-pressure side refrigerant pressure does not exceed the critical pressure of the refrigerant.

The compressor 41 is an electric compressor that is driven by power supplied from a battery, and the compressor 41 draws, compresses, and discharges the refrigerant in the refrigeration cycle 12. The compressor 41 may be a variable displacement compressor that is driven by an engine belt while being supplied with a driving force from the engine.

The condenser 23 is a heat exchanger that condenses the high-pressure side refrigerant by exchanging heat between the coolant and the high-pressure refrigerant discharged from the compressor 41.

The expansion valve 42 is a decompressor that decompresses and expands a liquid refrigerant flowing out of the condenser 23. The expansion valve 42 includes a thermo-sensitive portion that detects a superheat degree of the refrigerant on an outlet side of the evaporator 43 based on the temperature and the pressure of the refrigerant on the outlet side of the evaporator 43. That is, the expansion valve 42 is a thermal expansion valve that adjusts a throttle passage area by a mechanical mechanism such that the superheat degree of the refrigerant on the outlet side of the evaporator 43 is within a predetermined range. The expansion valve 42 may be an electric expansion valve that adjusts the throttle passage area by an electric mechanism.

The evaporator 43 is a low-pressure side heat exchanger that evaporates a low-pressure refrigerant decompressed and expanded by the expansion valve 42 via heat exchange between the low-pressure refrigerant and the air blown to the vehicle compartment. The gas-phase refrigerant evaporated at the evaporator 43 is drawn into and compressed by the compressor 41.

The refrigeration cycle 12 may include a chiller instead of the evaporator 43. The chiller is a coolant cooling heat exchanger that cools the coolant by exchanging heat between the coolant and the low-pressure refrigerant that is decompressed and expanded by the expansion valve 42.

Figure 2:
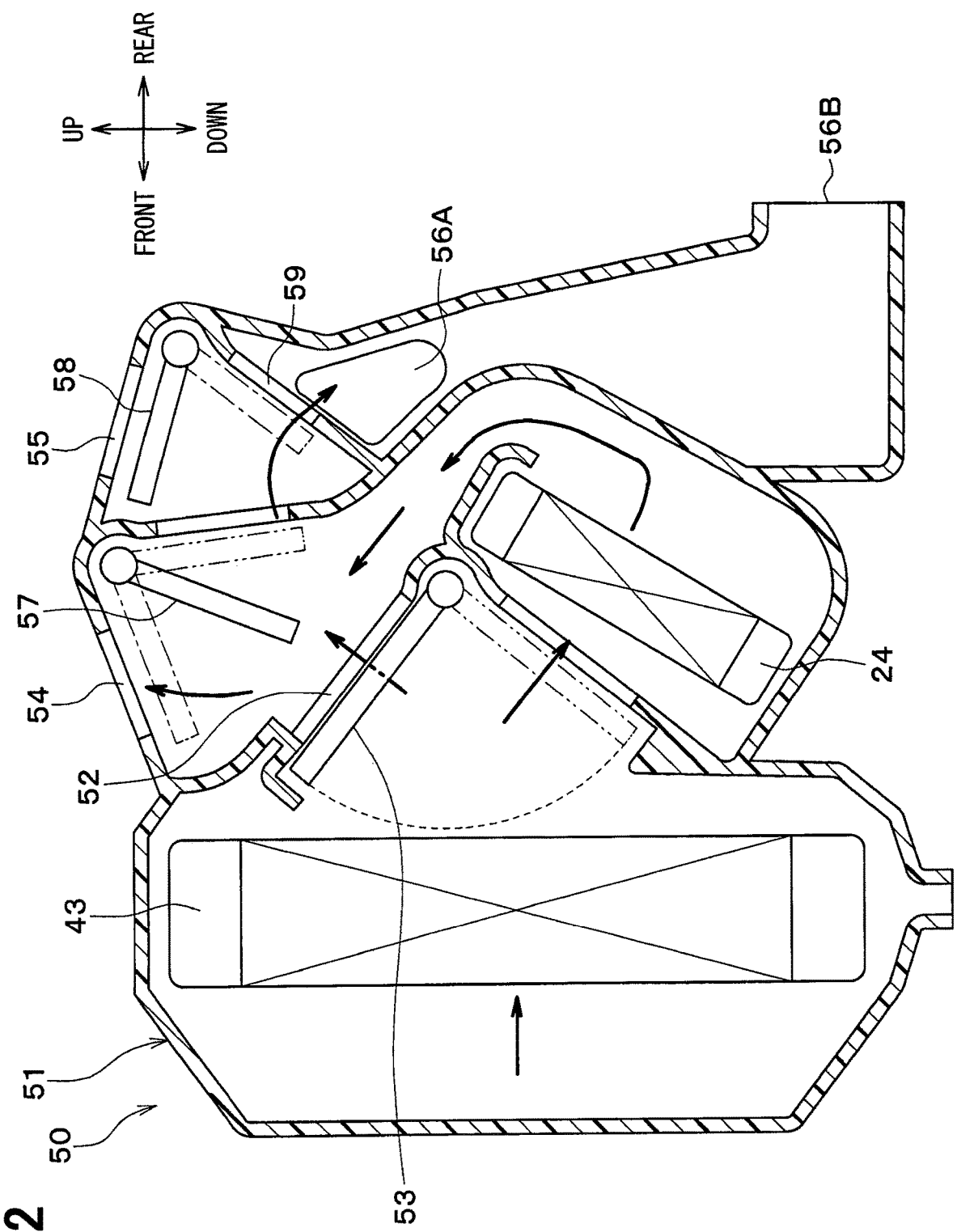
FIG. 2 is a cross-sectional diagram illustrating an inside air conditioning unit according to the first embodiment.

As shown in FIG. 2, the evaporator 43 and the heater core 24 are housed in a casing 51 of an inside air conditioning unit 50 of a vehicular air conditioning device. An air passage is defined in the casing 51.

Figure 3:
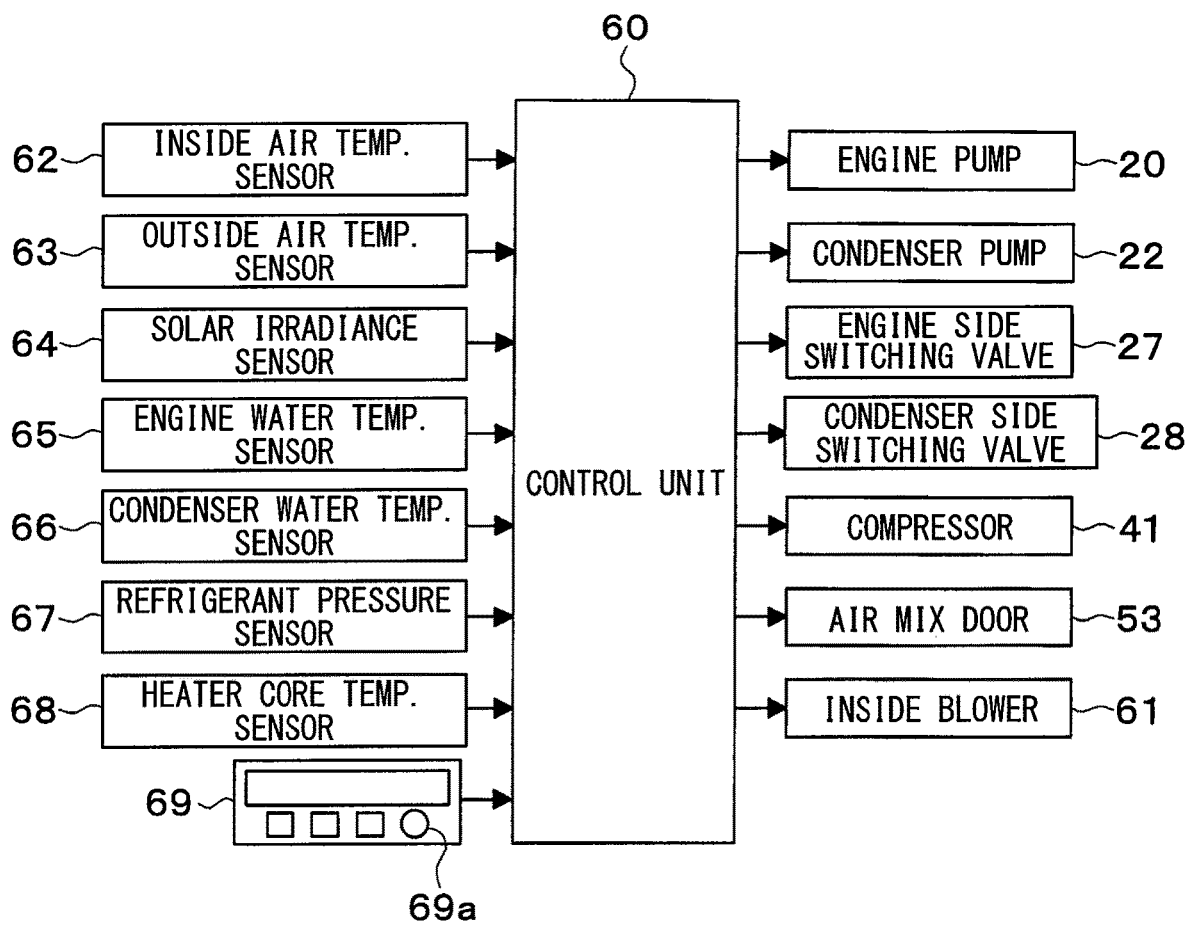
FIG. 3 is a block diagram illustrating an electric control unit of the vehicular heat management device according to the first embodiment.

An inside-outside air switching box and an inside blower 61 shown in FIG. 3 are provided in the most upstream part of the casing 51. The inside-outside air switching box is an inside-outside air switching portion that switches the air introduced therein between an outside air and an inside air. The outside air is an air outside the vehicle compartment. The inside air is an air inside the vehicle compartment.

The inside blower 61 is a blowing portion that draws and blows an air. In the casing 51, the evaporator 43 and the heater core 24 are positioned downstream of the inside blower 61 with respect to the airflow. The heater core 24 is located downstream of the evaporator 43 with respect to the airflow. The inside blower 61 is an air flow rate adjustment portion that adjusts the flow rate of the air flowing through the heater core 24.

A cooling air bypass passage 52 is defined in the casing 51, the cooling air bypass passage 52 is located downstream of the evaporator 43 with respect to the airflow. The cooling air bypass passage 52 is a passage through which a cooling air flowing through the evaporator 43 bypasses the heater core 24.

An air mix door 53 that is a temperature adjusting portion is provided between the evaporator 43 and the heater core 24. The air mix door 53 is a flow rate proportion adjustment portion that adjusts a ratio of the cool air flowing into the heater core 24 to the cooling air passing through the cooling air bypass passage 52 by adjusting an opening degree of the cooling air bypass passage 52 and an opening degree of the heater core 24 side air passage.

The air mix door 53 is a rotary door that includes a rotatable shaft that is rotatably supported by the casing 51, and a door board portion that is joined to the rotatable shaft.

The warm air flowing through the heater core 24 and the cool air flowing through the cooling air bypass passage 52 are mixed in the casing 51, and the temperature of the air blown to the space of the vehicle compartment is adjusted. Accordingly, the temperature of the conditioned air can be adjusted to a desired temperature by adjusting an opening degree of the air mix door 53.

A defogger opening portion 54, a face opening portion 55, a foot opening portion 56A, and a rear foot opening portion 56B are formed at a part of the casing 51 located on the most downstream portion with respect to the airflow.

The defogger opening portion 54 is connected to a defogger air outlet through a defogger duct. The defogger air outlet is located in the space of the vehicle compartment. The conditioned air is blown through the defogger air outlet toward an inside of the windshield.

The face opening portion 55 is connected to a face air outlet through a face duct. The face air outlet is located in the space of the vehicle compartment. The conditioned air is blown through the face air outlet toward an upper body of an occupant.

The foot opening portion 56A is connected to a foot duct. The foot duct extends downward. The conditioned air is blown toward feet of the occupant in the front seats through a foot air outlet that is located in an end of the foot duct.

The rear foot opening portion 56B is connected to a rear foot duct. The rear foot duct extends toward a rear side of the vehicle. The conditioned air is blown toward feet of the occupant in the rear seats through a rear foot air outlet that is located in an end of the rear foot duct.

The defogger opening portion 54 is opened and closed by a defogger door 57. The face opening portion 55, the foot opening portion 56A, and the rear foot opening portion 56B are opened and closed by a face-foot door 58.

The face-foot door 58 opens and closes a foot passage inlet portion 59, and accordingly the foot opening portion 56A and the rear foot opening portion 56B are opened and closed. The foot passage inlet portion 59 is an inlet portion of an air passage extending from a vicinity of the face opening portion 55 to the foot opening portion 56A and the rear foot opening portion 56B.

The defogger door 57 and the face-foot door 58 are rotary doors each of which includes a rotatable shaft rotatably supported by the casing 51 and a door board portion joined with the rotatable shaft.

Next, an electric control portion of the vehicular heat management device 10 will be described with reference to FIG. 3. A control unit 60 is constituted by a known microcomputer, including a CPU, a ROM, and a RAM, and a peripheral circuit thereof. The control unit 60 performs various computations and processing based on control programs stored in the ROM. Control target devices are connected to an output side of the control unit 60. The control unit 60 is a controlling portion that controls the operations of various control target devices.

The control target devices controlled by the control unit 60 include the engine pump 20, the condenser pump 22, the engine side switching valve 27, the condenser side switching valve 28, the compressor 41, the air mix door 53 of the inside air conditioning unit 50, and the inside blower 61, for example.

Detection signals from a group of sensors are input to the input side of the control unit 60, the group of sensors including the inside air temperature sensor 62, the outside air temperature sensor 63, the solar irradiance sensor 64, the engine water temperature sensor 65, the condenser water temperature sensor 66, the refrigerant pressure sensor 67, and the heater core temperature sensor 68, for example.

The inside air temperature sensor 62 is an inside air temperature detector that detects a temperature of the inside air. The outside air temperature sensor 63 is an outside air temperature detector that detects a temperature of the outside air. The solar irradiance sensor 64 is a solar irradiance detector that detects the amount of solar irradiance in the vehicle compartment.

The engine water temperature sensor 65 is a coolant temperature detector that detects a temperature of the coolant flowing through the engine pathway 30. The condenser water temperature sensor 66 is a coolant temperature detector that detects the temperature of the coolant flowing through the condenser pathway 31.

The refrigerant pressure sensor 67 is a refrigerant pressure detector that detects a pressure of the refrigerant. The heater core temperature sensor 68 is a heat exchanger temperature detector that detects a temperature of the heater core 24. For example, the heater core temperature sensor 68 is a coolant temperature sensor that detects the temperature of the coolant flowing through the heater core 24. The heater core temperature sensor 68 may be a fin thermistor that detects a temperature of a heat exchanging fin of the heater core 24.

Next, actuations of the above-described configurations will be described below. First, actuations in a heating operation are described. The control unit 60 controls operations of the engine side switching valve 27 and the condenser side switching valve 28 based on a load of the engine 21.

Specifically, the control unit 60 controls operations of the engine side switching valve 27 and the condenser side switching valve 28 based on the coolant temperature of the engine pathway 30. When the load of the engine 21 is low, the temperature of the coolant of the engine pathway 30 becomes low due to decrease of waste heat of the engine 21. When the load of the engine 21 is high, the temperature of the coolant of the engine pathway 30 becomes high due to increase of waste heat of the engine 21.

For example, the control unit 60 switches between the following conditions (1) through (7) by controlling the actuations of the engine side switching valve 27 and the condenser side switching valve 28.

(1) Immediately after Starting

For example, when an ignition switch of a vehicle is turned on to start the vehicular heat management device 10, the temperature of the coolant of the condenser pathway 31 and the heater core pathway 32 are the same as the temperature of the outside air.

Figure 4:
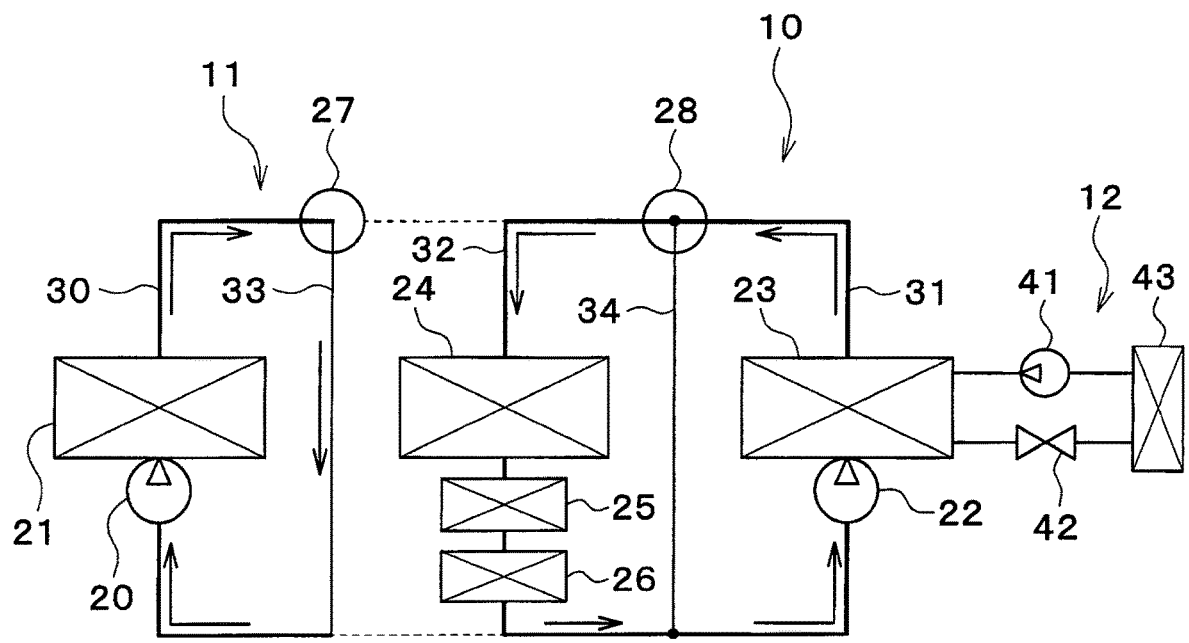
FIG. 4 is a diagram illustrating an operation mode of the vehicular heat management device according to the first embodiment.

At this time, the control unit 60 controls the operations of the engine side switching valve 27 and the condenser side switching valve 28 so as to form the coolant circuit shown in FIG. 4. Specifically, the engine side switching valve 27 and the condenser side switching valve 28 connects the heater core pathway 32 to the condenser pathway 31, and do not connect the heater core pathway 32 to the engine pathway 30. According to this, the temperature of the coolant in the heater core pathway 32 becomes approximately the same as the temperature of the coolant in the condenser pathway 31.

The control unit 60 sets a rotation speed of the compressor 41 to be maximum. According to this, a capacity of the condenser 23 to heat the coolant becomes maximum. Since the coolant heated by the condenser 23 flows through the heater core 24, the air blown to the vehicle compartment is heated.

When the temperature of the coolant heated by the condenser 23 is not sufficiently high, the control unit 60 sets the amount of the air blown by the inside blower 61 of the inside air conditioning unit 50 to be a small amount. The condition where the temperature of the coolant heated by the condenser 23 is not sufficiently high means, for example, a condition where the temperature of the coolant heated by the condenser 23 is at about 40 degrees Celsius. According to this, since the amount of the air heated by the heater core 24 becomes small, the temperature of the air flowing through the heater core 24 can be as high as possible even when the temperature of the coolant heated by the condenser 23 is not sufficiently high.

When the temperature of the coolant heated by the condenser 23 is sufficiently high, the control unit 60 increases the amount of the air blown by the inside blower 61 of the inside air conditioning unit 50 to be a large amount. The condition where the temperature of the coolant heated by the condenser 23 is sufficiently high means, for example, a condition where the temperature of the coolant heated by the condenser 23 is at or above 45 degrees Celsius. According to this, the amount of the air blown to the vehicle compartment can be increased while the temperature of the air flowing through the heater core 24 is increased, and accordingly the vehicle compartment can be heated rapidly.

When the vehicle compartment is warmed to some extent, the control unit 60 sets the amount of the air blown by the inside blower 61 of the inside air conditioning unit 50 to be a middle amount or a low amount to end the rapid heating. The condition where the vehicle compartment is warmed to some extent means, for example, a condition where a temperature Tr in the vehicle compartment is at or above a predetermined value Tr1.

(2) After Warming the Engine

Figure 5:
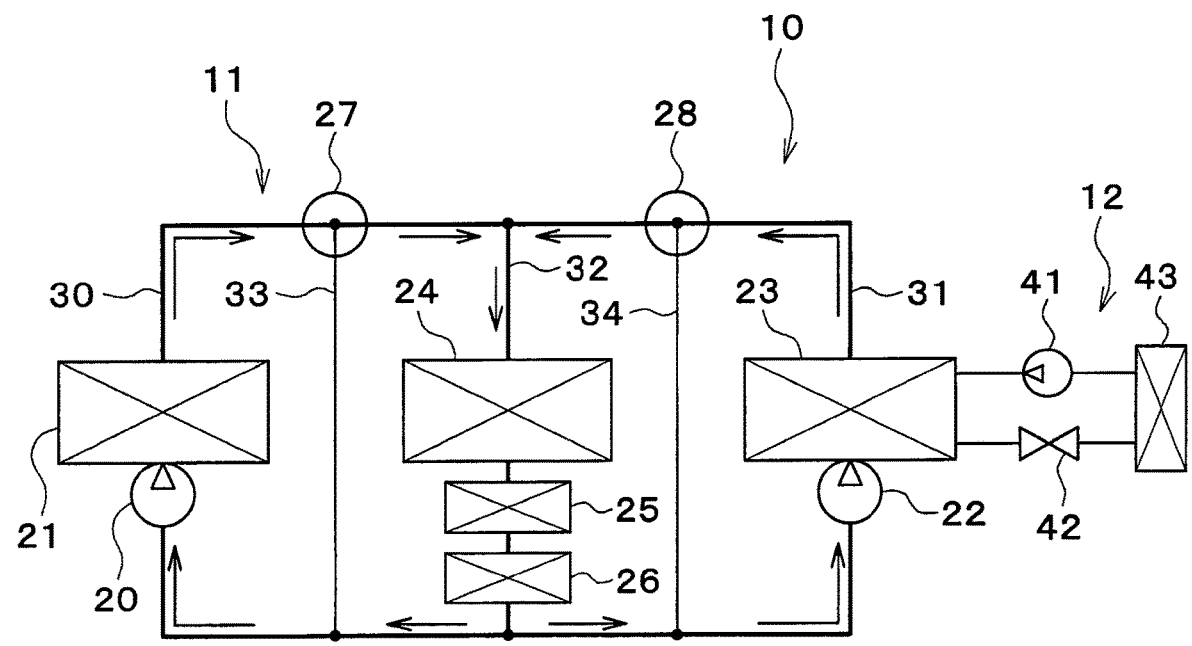
FIG. 5 is a diagram illustrating another operation mode of the vehicular heat management device according to the first embodiment.

When the coolant in the engine pathway 30 is heated during the above-described condition immediately after the starting of the vehicular heat management device 10, and the temperature of the coolant in the engine pathway 30 is at or above a first predetermined temperature TW1, the control unit 60 controls the operations of the engine side switching valve 27 and the condenser side switching valve 28 such that the cooling circuit shown in FIG. 5 is formed. The first predetermined temperature TW1 is 40 degrees Celsius, for example. Specifically, the engine side switching valve 27 and the condenser side switching valve 28 provide a communication between the heater core pathway 32, the engine pathway 30, and the condenser pathway 31.

According to this, the coolant heated by the engine 21 and the coolant heated by the condenser 23 flow through the heater core 24, and accordingly the air sent to the vehicle compartment is heated. That is, since the temperature of the coolant in the engine pathway 30 is not sufficiently increased, and the air heating capacity of the coolant heated by the engine 21 is not sufficient, the coolant heated by the condenser 23 also flows through the heater core 24 to supplement the air heating capacity.

Figure 6:
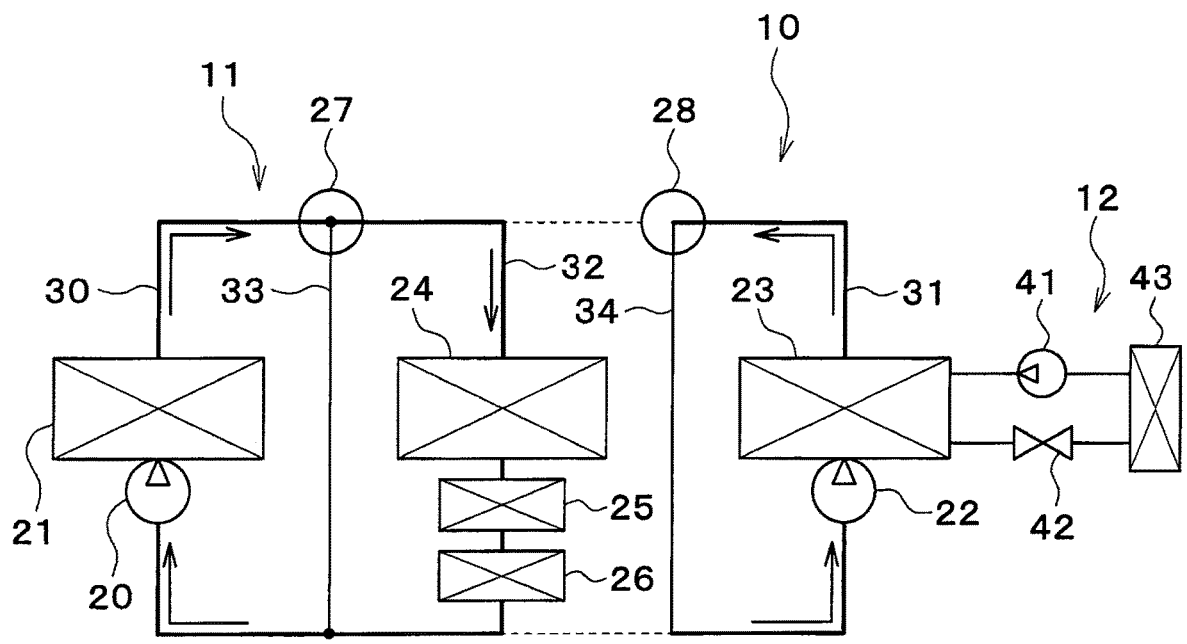
FIG. 6 is a diagram illustrating another operation mode of the vehicular heat management device according to the first embodiment.

When the temperature of the coolant in the condenser pathway 31 is lower than the temperature of the coolant in the engine pathway 30, the control unit 60 decreases the amount of the coolant flowing from the condenser pathway 31 to the heater core pathway 32, or does not connect the heater core pathway 32 to the condenser pathway 31 as shown in FIG. 6. According to this, a decrease of the temperature of the coolant in the engine pathway 30 due to a low-temperature coolant in the condenser pathway 31 can be avoided.

In this case, the control unit 60 sets the rotation speed of the compressor 41 to be maximum. According to this, the coolant heating capacity of the condenser 23 becomes high.

The control unit 60 sets the air blowing amount of the inside blower 61 of the inside air conditioning unit 50 to a high amount. According to this, the flow rate of the air sent to the vehicle compartment can be increased to heat the vehicle compartment rapidly. When the vehicle compartment is warmed to some extent, the control unit 60 sets the amount of the air blown by the inside blower 61 of the inside air conditioning unit 50 to be a middle amount or a low amount to end the rapid heating. The condition where the vehicle compartment is warmed to some extent means, for example, a condition where the temperature Tr of the vehicle compartment is at or above the predetermined value Tr1.

(3) When the Engine Load is Increasing During Middle-Load

When the amount of the waste heat and the load of the engine 21 increase in the above-described condition after warming the engine, and the temperature of the coolant in the engine pathway 30 is at or above a second predetermined temperature TW2, the control unit 60 controls the engine side switching valve 27 and the condenser side switching valve 28 to form a coolant circuit shown in FIG. 6. The second predetermined temperature TW2 is higher than the first predetermined temperature TW1. For example, the second predetermined temperature TW2 is 60 degrees Celsius.

Specifically, the engine side switching valve 27 and the condenser side switching valve 28 connect the heater core pathway 32 to the engine pathway 30, but do not connect the heater core pathway 32 to the condenser pathway 31. According to this, the temperature of the coolant in the heater core pathway 32 becomes almost the same as the temperature of the coolant in the engine pathway 30.

Accordingly, since the coolant heated by the engine 21 flows through the heater core 24, the air sent to the vehicle compartment is heated. That is, since the temperature of the coolant in the engine pathway 30 is sufficiently increased, the coolant heated by the engine 21 can provide sufficient air heating capacity.

In this case, the control unit 60 maintains the temperature of the coolant in the condenser pathway 31 to be at or above the first predetermined temperature TW1, and controls the rotation speed of the compressor 41 to be as low as possible. Specifically, the control unit 60 decreases the rotation speed of the compressor 41 to be lower than the highest speed. According to this, the coolant heating capacity of the condenser 23 can be prevented from being excessively high, and the power consumption of the compressor 41 can be saved.

The control unit 60 sets the amount of the air blown by the inside blower 61 of the inside air conditioning unit 50 to be the large amount. According to this, the amount of the air sent to the vehicle compartment can be increased to heat the vehicle compartment rapidly. When the vehicle compartment is heated to some extent, the control unit 60 sets the amount of the air blown by the inside blower 61 of the inside air conditioning unit 50 to be a middle amount or a low amount to end the rapid heating. The condition where the vehicle compartment is heated to some extent means a condition where the temperature Tr of the vehicle compartment is at or above the predetermined value Tr1.

(4) When the Engine Load is High

In the above-described condition where the engine load is increasing and is middle-load, when the amount of the waste heat and the load of the engine 21 further increase, and the temperature of the coolant in the engine pathway 30 is at or above a third predetermined temperature TW3, the control unit 60 controls the engine side switching valve 27 and the condenser side switching valve 28 such that the coolant circuit shown in FIG. 5 is formed. The third predetermined temperature TW3 is higher than the second predetermined temperature TW2. The third predetermined temperature TW3 is 80 degrees Celsius, for example.

Specifically, the engine side switching valve 27 and the condenser side switching valve 28 connect the heater core pathway 32 to the engine pathway 30 and the condenser pathway 31.

According to this, the coolant heated by the engine 21 flows through the heater core 24, and the air sent to the vehicle compartment is heated. The coolant heated by the engine 21 also flow through the condenser pathway 31.

That is, since the temperature of the coolant in the engine pathway 30 is excessively high, the temperature of the coolant in the engine pathway 30 is decreased by flowing the coolant into the condenser pathway 31. According to this, the heater core 24 can be prevented from having excessive air heating capacity. Moreover, a heat dissipation from the engine pathway 30 to an ambient air can be limited. Since the temperature of the coolant in the condenser pathway 31 can be maintained to be at or above the first predetermined temperature TW1 even when the coolant heating capacity of the condenser 23 is decreased, the rotation speed of the compressor 41 can be decreased to save the power consumption of the compressor 41.

In this case, the control unit 60 sets the amount of the air blown by the inside blower 61 of the inside air conditioning unit 50 to be large amount. According to this, the amount of the air sent to the vehicle compartment can be large, and the vehicle compartment can be rapidly heated. When the vehicle compartment is heated to some extent, the control unit 60 sets the amount of the air blown by the inside blower 61 of the inside air conditioning unit 50 to be middle or low amount to end the rapid heating. The condition where the vehicle compartment is heated to some extent means, for example, a condition where the temperature Tr of the vehicle compartment is at or above the predetermined value Tr1.

(5) When the Engine Load is Decreasing During Middle-Load

When the amount of the waste heat and the load of the engine 21 decrease during the above-described high engine load situation, and the temperature of the coolant in the engine pathway 30 is at or above the second predetermined temperature TW2 and lower than the third predetermined temperature TW3, the control unit 60 controls the operations of the engine side switching valve 27 and the condenser side switching valve 28 such that the coolant circuit shown in FIG. 6 is formed.

Specifically, the engine side switching valve 27 and the condenser side switching valve 28 connect the heater core pathway 32 to the engine pathway 30, but do not connect the heater core pathway 32 to the condenser pathway 31.

According to this, the coolant heated by the engine 21 flows through the heater core 24, and thus the air sent to the vehicle compartment is heated. That is, since the temperature of the coolant in the engine pathway 30 is sufficiently increased, the coolant heated by the engine 21 has sufficient air heating capacity.

In this case, the control unit 60 increases the rotation speed of the compressor 41. According to this, the heating capacity of the coolant in the condenser 23 is increased to increase the temperature of the coolant in the condenser pathway 31.

Further, the control unit 60 sets the air blowing amount of the inside blower 61 of the inside air conditioning unit 50 to be large. According to this, the amount of the air sent to the vehicle compartment is increased, and the vehicle compartment can be heated rapidly. When the vehicle compartment is heated to some extent, the control unit 60 sets the air blowing amount of the inside blower 61 of the inside air conditioning unit 50 to be medium or small to end the rapid heating. The condition where the vehicle compartment is heated to some extent means, for example, a condition where the temperature Tr in the vehicle compartment is at or above the predetermined value Tr1.

(6) When the Engine Load is Decreasing During Low-Load

When the amount of the waste heat and the load of the engine 21 further decrease in the above-described condition where the engine load is decreasing during the medium-load, and the temperature of the coolant in the engine pathway 30 is at or above the first predetermined temperature TW1 and lower than the second predetermined temperature TW2, the control unit 60 controls the operations of the engine side switching valve 27 and the condenser side switching valve 28 such that the coolant circuit shown in FIG. 5 is formed.

Specifically, the engine side switching valve 27 and the condenser side switching valve 28 connect the heater core pathway 32 to the condenser pathway 31 and the engine pathway 30. According to this, the coolant heated by the engine 21 and the coolant heated by the condenser 23 flow through the heater core 24, and thus the air sent to the vehicle compartment is heated.

That is, since the temperature of the coolant in the engine pathway 30 is insufficient, the coolant heated by the engine 21 does not have sufficient air heating capacity, and accordingly the coolant heated by the condenser 23 also flows through the heater core 24 to supplement the insufficiency of the air heating capacity.

When the temperature of the coolant in the condenser pathway 31 is lower than the temperature of the coolant in the engine pathway 30, the control unit 60 decreases the flow rate of the coolant flowing from the condenser pathway 31 into the heater core pathway 32 or does not connect the heater core pathway 32 to the condenser pathway 31 as shown in FIG. 6. According to this, the temperature decrease of the coolant in the engine pathway 30 due to the low-temperature coolant from the condenser pathway 31 can be avoided.

In this case, the control unit 60 increases the rotation speed of the compressor 41. According to this, the heating capacity of the coolant in the condenser 23 is increased to increase the temperature of the coolant in the condenser pathway 31.

Further, the control unit 60 sets the air blowing amount of the inside blower 61 of the inside air conditioning unit 50 to be large. According to this, the amount of the air sent to the vehicle compartment is increased, and the vehicle compartment can be heated rapidly. When the vehicle compartment is heated to some extent, the control unit 60 sets the air blowing amount of the inside blower 61 of the inside air conditioning unit 50 to be medium or small to end the rapid heating. The condition where the vehicle compartment is heated to some extent means, for example, a condition where the temperature Tr in the vehicle compartment is at or above the predetermined value Tr1.

(7) When the Engine Temperature is Low

When the amount of the waste heat and the load of the engine 21 further decrease in the above-described condition where the engine load is decreasing during the low-load, and the temperature of the coolant in the engine pathway 30 is lower than the first predetermined temperature TW1, the control unit 60 controls the operations of the engine side switching valve 27 and the condenser side switching valve 28 such that the coolant circuit shown in FIG. 4 is formed. Specifically, the engine side switching valve 27 and the condenser side switching valve 28 connect the heater core pathway 32 to the condenser pathway 31, but do not connect the heater core pathway 32 to the engine pathway 30.

Further, the control unit 60 increases the rotation speed of the compressor 41. According to this, the heating capacity of the coolant in the condenser 23 is increased to increase the temperature of the coolant in the condenser pathway 31. Since the coolant heated by the condenser 23 flows through the heater core 24, the air sent to the vehicle compartment is heated.

The control unit 60 sets the air blowing amount of the inside blower 61 of the inside air conditioning unit 50 to be large. According to this, the amount of the air sent to the vehicle compartment is increased, and the vehicle compartment can be heated rapidly. When the vehicle compartment is heated to some extent, the control unit 60 sets the air blowing amount of the inside blower 61 of the inside air conditioning unit 50 to be medium or small to end the rapid heating. The condition where the vehicle compartment is heated to some extent means, for example, a condition where the temperature Tr in the vehicle compartment is at or above the predetermined value Tr1.

Figure 7:
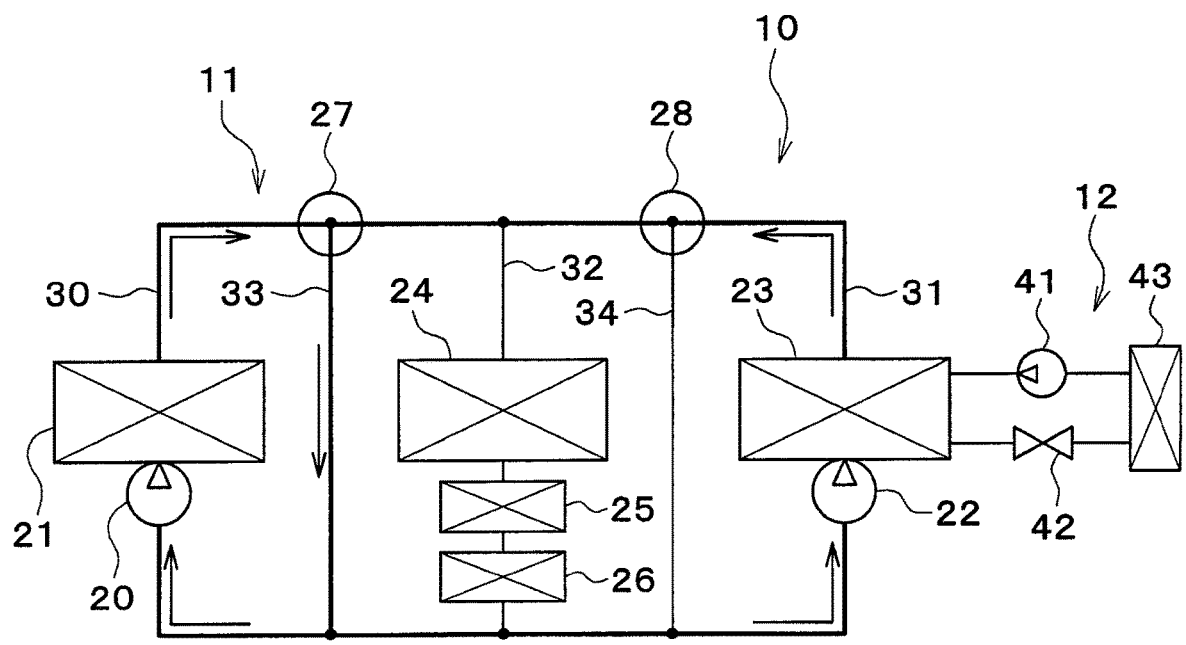
FIG. 7 is a diagram illustrating another operation mode of the vehicular heat management device according to the first embodiment.

Next, actuations in the cooling operation will be described. When the temperature of the coolant in the condenser pathway 31 is at or above the first predetermined temperature TW1, and the temperature of the coolant in the engine pathway 30 is below the first predetermined temperature TW1, the control unit 60 controls the operations of the engine side switching valve 27 and the condenser side switching valve 28 such that the coolant circuit shown in FIG. 7 is formed. Specifically, the engine side switching valve 27 and the condenser side switching valve 28 connect the engine pathway 30 to the condenser pathway 31.

According to this, since the coolant heated by the condenser 23 flows through the engine 21, the engine 21 can be heated. Since the heat of the coolant heated by the condenser 23 is dissipated to the engine 21, the high-pressure side refrigerant of the refrigeration cycle 12 can be effectively cooled by the condenser 23. Accordingly, a coefficient of performance (i.e. COP) of the refrigeration cycle 12 in the cooling operation can be improved.

In the present embodiment, when the temperature of the coolant in the heater core pathway 32 is at or above a predetermined temperature, the control unit 60 performs at least one of a first switching control or a second heat source control such that the temperature of the coolant in the condenser pathway 31 is higher than the temperature of the outside air. In the first switching control, the control unit 60 controls the operations of the engine side switching valve 27 and the condenser side switching valve 28 such that the condenser pathway 31 is connected to the heater core pathway 32. In the second heat source control, the control unit 60 makes the condenser 23 that is a second heat source generate heat.

According to this, when the temperature of the coolant in the heater core pathway 32 is high, the temperature of the coolant in the condenser pathway 31 can be increased by at least one of the coolant in the heater core pathway 32 and the heat generation of the condenser 23.

Accordingly, since the temperature difference of the coolant between the heater core pathway 32 and the condenser pathway 31 can be reduced, temperature change of the heat medium flowing into the heater core 24 when the heater core pathway 32 is connected to the condenser pathway 31 can be limited.

Since the condenser pathway 31 is connected to the heater core pathway 32, the temperature of the coolant in the heater core pathway 32 can be limited from increasing excessively. Accordingly, since the heat dissipation from the heater core pathway 32 to the outside air can be limited, the heat of the coolant in the heater core pathway 32 can be effectively used for reducing the temperature difference between the coolant in the heater core pathway 32 and the coolant in the condenser pathway 31. Consequently, the amount of the heat generation of the condenser 23 for heating the coolant in the condenser pathway 31 can be reduced, and accordingly the energy consumed by the condenser 23 can be saved.

In the present embodiment, when the engine side switching valve 27 and the condenser side switching valve 28 connect the engine pathway 30 to the heater core pathway 32, and the temperature of the coolant in the heater core pathway 32 is at or above the predetermined temperature, the control unit 60 performs at least one of the above-described first switching control and the second heat source control.

According to this, when the air is heated by the heater core 24 by using the waste heat of the engine 21, the temperature difference between the coolant in the engine pathway 30 and the coolant in the condenser pathway 31 can be reduced, and accordingly the change of the heater core blowing-out temperature when the heater core pathway 32 is connected to the condenser pathway 31 can be limited. The heater core blowing-out temperature is a temperature of the air flowing through the heater core 24.

Since the condenser pathway 31 is connected to the heater core pathway 32, the temperature of the coolant in the engine pathway 30 and the coolant in the heater core pathway 32 can be limited from increasing excessively. Accordingly, since the heat dissipations from the engine pathway 30 and the heater core pathway 32 to the outside air can be limited, the heat of the coolant in the engine pathway 30 and the coolant in the heater core pathway 32 can be effectively used for reducing the temperature difference between the coolant in the engine pathway 30, the coolant in the heater core pathway 32, and the coolant in the condenser pathway 31. Consequently, the amount of the heat generation of the condenser 23 for heating the coolant in the condenser pathway 31 can be reduced, and accordingly the energy consumed by the condenser 23 can be reduced. That is, the energy consumption of the compressor 41 can be limited.

In the present embodiment, when the temperature of the coolant in the heater core pathway 32 is at or above the predetermined temperature, and the temperature of the coolant in the engine pathway 30 is lower than the predetermined temperature, the control unit 60 controls the operations of the engine side switching valve 27 and the condenser side switching valve 28 such that the engine pathway 30 is connected to the heater core pathway 32, and thus the temperature of the coolant in the engine pathway 30 is increased.

According to this, when the temperature of the coolant in the heater core pathway 32 is high, the temperature of the coolant in the engine pathway 30 can be increased by the coolant in the heater core pathway 32.

Accordingly, since the temperature difference between the coolant in the heater core pathway 32 and the coolant in the engine pathway 30 can be reduced, the temperature change of the heat medium flowing into the heater core 24 when the heater core pathway 32 is connected to the engine pathway 30 can be limited.

In the present embodiment, when: the engine side switching valve 27 and the condenser side switching valve 28 connect the condenser pathway 31 to the heater core pathway 32; the temperature of the coolant in the heater core pathway 32 is at or above the predetermined temperature; and the temperature of the coolant in the engine pathway 30 is lower than the predetermined temperature, the control unit 60 controls the engine side switching valve 27 and the condenser side switching valve 28 such that the engine pathway 30 is connected to the heater core pathway 32.

According to this, the temperature of the coolant in the engine pathway 30 can be increased by using heat of the coolant in the condenser pathway 31 as well as heat of the coolant in the heater core pathway 32.

In the present embodiment, when the temperature of the coolant in the engine pathway 30 is at or above the predetermined temperature, the control unit 60 performs at least one of a second switching control and the second heat source control to increase the temperature of the coolant in the condenser pathway 31 to be higher than the temperature of the outside temperature. In the second switching control, the control unit 60 controls the operations of the engine side switching valve 27 and the condenser side switching valve 28 such that the condenser pathway 31 is connected to the engine pathway 30. In the second heat source control, the control unit 60 makes the condenser 23 that is the second heat source generate heat.

According to this, when the temperature of the coolant in the engine pathway 30 is high, the temperature of the coolant in the condenser pathway 31 can be increased by at least one of the coolant in the engine pathway 30 and the heat generation of the condenser 23.

Accordingly, the temperature difference between the coolant in the engine pathway 30 and the coolant in the condenser pathway 31 can be reduced, the temperature change of the heat medium flowing into the heater core 24 can be limited when a coolant pathway connected to the heater core pathway 32 is switched.

Since the condenser pathway 31 is connected to the engine pathway 30, the temperature of the coolant in the engine pathway 30 can be limited from increasing excessively. Accordingly, since the heat dissipation from the engine pathway 30 to the outside air can be limited, the heat of the coolant in the engine pathway 30 can be effectively used for reducing the temperature difference between the coolant in the engine pathway 30 and the coolant in the condenser pathway 31. Consequently, the amount of the heat generation of the condenser 23 for heating the coolant in the condenser pathway 31 can be reduced, and accordingly the energy consumed by the compressor 41 can be reduced. That is, the energy consumption of the compressor 41 can be limited.

In the present embodiment, when the engine side switching valve 27 and the condenser side switching valve 28 connect the engine pathway 30 to the heater core pathway 32, and the temperature of the coolant in the engine pathway 30 is at or above the predetermined temperature, the control unit 60 performs at least one of the above-described second switching control and the second heat source control.

According to this, when the air is heated by the heater core 24 by using the waste heat of the engine 21, the temperature difference between the coolant in the engine pathway 30 and the coolant in the condenser pathway 31 can be reduced, and accordingly the temperature change of the heater core blowing-out air when the heater core pathway 32 is connected to the condenser pathway 31 can be limited.

Since the condenser pathway 31 is connected to the engine pathway 30, the temperature of the coolant in the engine pathway 30 and the coolant in the heater core pathway 32 can be limited from increasing excessively. Accordingly, since the heat dissipation from the engine pathway 30 and the heater core pathway 32 to the outside air can be limited, the heat of the coolant in the engine pathway 30 and the coolant in the heater core pathway 32 can be effectively used for reducing the temperature difference between the coolant in the engine pathway 30, the coolant in the heater core pathway, and the coolant in the condenser pathway 31. Consequently, the amount of the heat generation of the condenser 23 for heating the coolant in the condenser pathway 31 can be reduced, and accordingly the energy consumed by the compressor 41 can be saved. That is, the energy consumed by the compressor 41 can be reduced.

In the present embodiment, when the temperature of the coolant in the condenser pathway 31 is at or above the predetermined temperature, and the temperature of the coolant in the engine pathway 30 is lower than the predetermined temperature, the control unit 60 controls the operations of the engine side switching valve 27 and the condenser side switching valve 28 such that the engine pathway 30 is connected to the condenser pathway 31, and accordingly the temperature of the coolant in the engine pathway 30 is increased.

According to this, when the temperature of the coolant in the condenser pathway 31 is high, the temperature of the coolant in the engine pathway 30 can be increased by the coolant in the condenser pathway 31.

Accordingly, since the temperature difference between the coolant in the condenser pathway 31 and the coolant in the engine pathway 30 can be reduced, the temperature change of the heat medium flowing into the heater core 24 can be limited when a heat medium pathway connected to the heater core pathway 32 is switched.

In the present embodiment, when: the engine side switching valve 27 and the condenser side switching valve 28 connect the condenser pathway 31 to the heater core pathway 32; the temperature of the coolant in the condenser pathway 31 is at or above the predetermined temperature; and the temperature of the coolant in the engine pathway 30 is lower than the predetermined temperature, the control unit 60 controls the engine side switching valve 27 and the condenser side switching valve 28 such that the engine pathway 30 is connected to the condenser pathway 31.

According to this, the temperature of the coolant in the engine pathway 30 can be increased by using heat of the coolant in the condenser pathway 31 in addition to heat of the coolant in the heater core pathway 32.

In the present embodiment, the condenser 23 is a refrigerant-heat medium heat exchanger that exchanges heat between the high-pressure side refrigerant of the refrigeration cycle 12 and the coolant. According to this, since the condenser 23 is heated by using the refrigeration cycle 12 whose energy efficiency is high, the energy used for increasing the temperature of the coolant in the condenser pathway 31 can be saved.

In the present embodiment, the control unit 60 controls the operations of the engine side switching valve 27 and the condenser side switching valve 28 so as to increase a proportion of the flow rate of the coolant flowing from the engine 21 into the heater core 24 to the flow rate of the coolant flowing from the engine 21 and the heater core 24 into the heater core 24, as the load of the engine 21 changes from the low-load to the high-load. According to this, the air can be heated by the heater core 24 by effectively using the waste heat of the engine 21.

In the present embodiment, the control unit 60 controls the operations of the engine side switching valve 27 and the condenser side switching valve 28 so as to increase a proportion of the flow rate of the coolant flowing from the condenser 23 into the heater core 24 to the flow rate of the coolant flowing from the engine 21 and the condenser 23 into the heater core 24, as the load of the engine 21 changes from the high-load to the low-load. According to this, when the waste heat of the engine 21 is insufficient, the air can be heated by the heater core 24 by using the heat generation of the condenser 23.

Second Embodiment

In the above-described first embodiment, the EGR cooler 25 and the exhaust gas heat recovery unit 26, which are heat generators mounted on a vehicle, are located downstream of the heater core 24 in the heater core pathway 32 with respect to the flow of the coolant, but the vehicular heat generators 25, 26 may be located arbitrarily in the coolant circuit 11.

Figure 8:
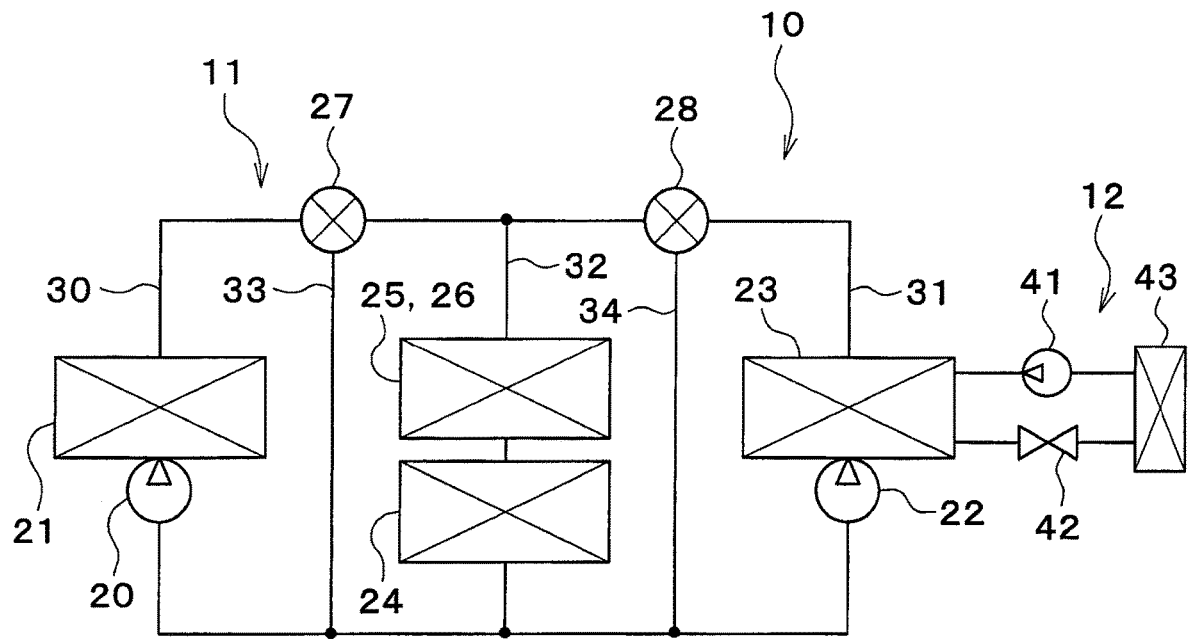
FIG. 8 is a diagram illustrating a vehicular heat management device according to a first practical example of a second embodiment of the present disclosure.

In a first practical example shown in FIG. 8, the EGR cooler 25 and the exhaust gas heat recovery unit 26 are located upstream of the heater core 24 in the heater core pathway 32 with respect to the flow of the coolant.

Figure 9:
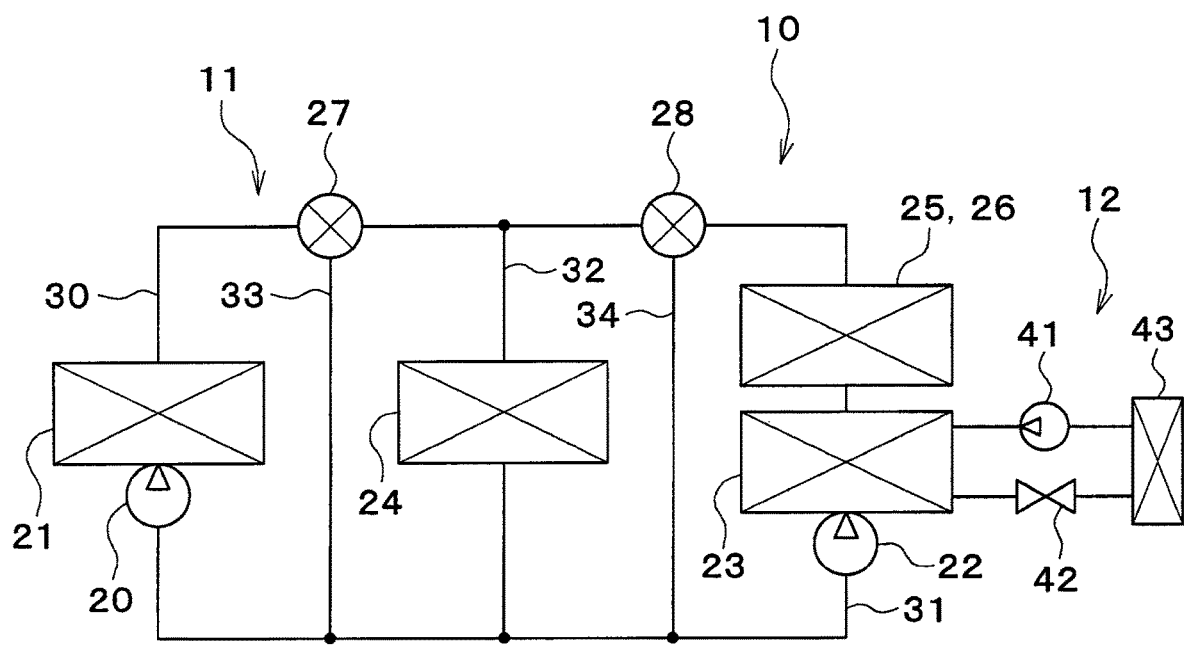
FIG. 9 is a diagram illustrating the vehicular heat management device according to a second practical example of the second embodiment.

In a second practical example shown in FIG. 9, the EGR cooler 25 and the exhaust gas heat recovery unit 26 are located downstream of the condenser 23 in the condenser pathway 31 with respect to the flow of the coolant.

Figure 10:
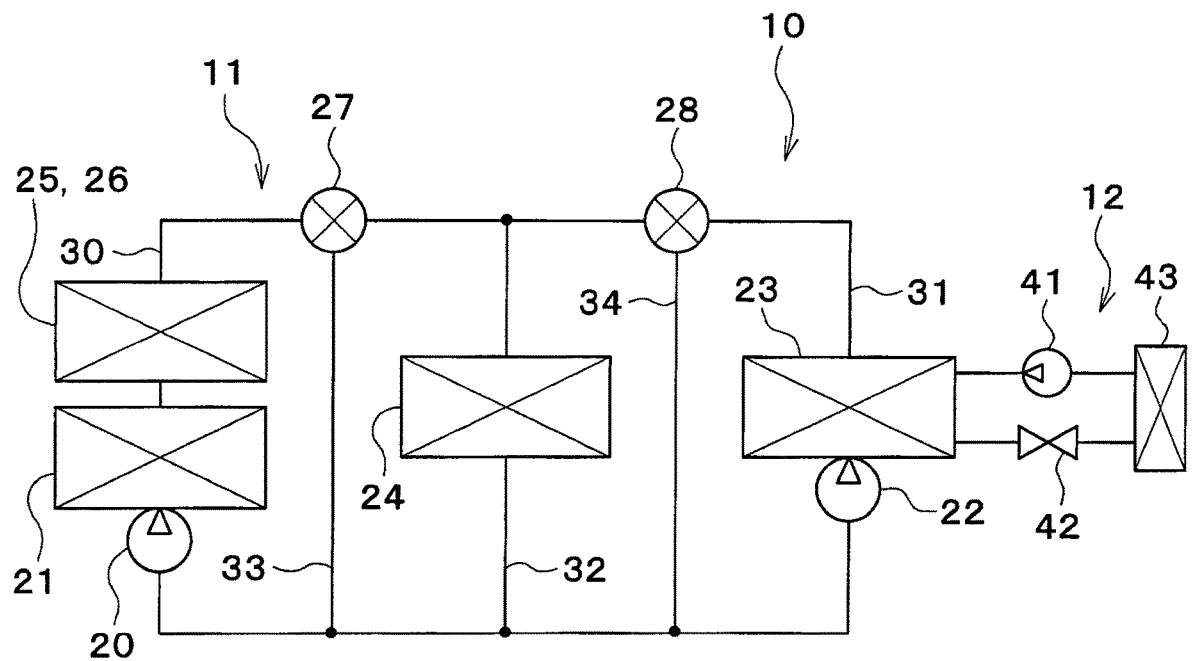
FIG. 10 is a diagram illustrating the vehicular heat management device according to a third practical example of the second embodiment.

In a third practical example shown in FIG. 10, the EGR cooler 25 and the exhaust gas heat recovery unit 26 are located downstream of the engine 21 in the engine pathway 30 with respect to the flow of the coolant.

Figure 11:
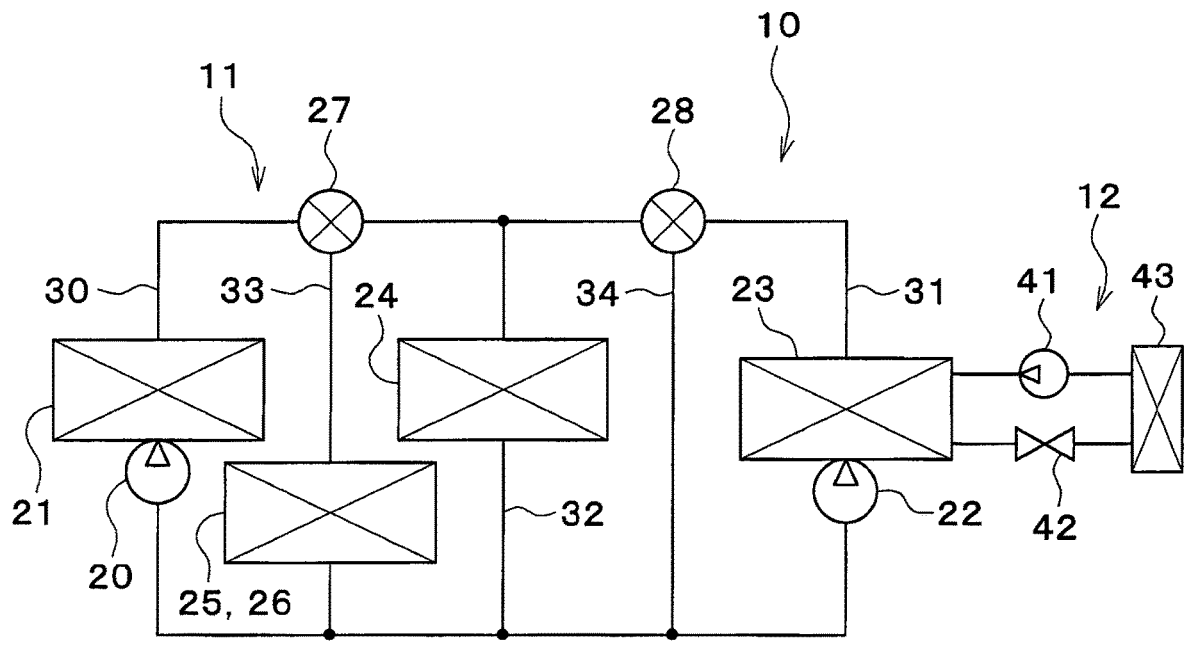
FIG. 11 is a diagram illustrating the vehicular heat management device according to a fourth practical example of the second embodiment.

In a fourth practical example shown in FIG. 11, the EGR cooler 25 and the exhaust gas heat recovery unit 26 are located in the engine side bypass pathway 33.

The same effects as the above-described first embodiment can be obtained by the present embodiment.

The above-described embodiments can be combined as required. The above-described embodiments can be modified as follows, for example.

In the above-described embodiments, the coolant is used as the heat medium circulating in the coolant circuit 11, but another medium such as oil may be used as the heat medium.

A nanofluid may be used as the heat medium. The nanofluid is a fluid containing nanometer-sized particles, called nanoparticles. Since the nanoparticles are contained, the following effects can be obtained in addition to the effect of decreasing the freezing point like a coolant containing ethylene glycol (i.e. antifreeze mixture).

That is, an effect of improving thermal conductivity within a specific temperature range, an effect of increasing a heat capacity of the heat medium, an effect of limiting corrosion of metal pipes and deterioration of rubber pipes, and an effect of increasing fluidity of the heat medium at an extremely low temperature can be obtained.

These effects vary based on components of nanoparticles, shapes of the particles, a proportion of the particles, and additives.

Thus, since the mixture of nanoparticles can improve its thermal conductivity, even in a small amount, the mixture of nanoparticles can exhibit substantially the same cooling efficiency, compared with the coolant using ethylene glycol.

Further, since the thermal capacity of the heat medium can be increased, a cold storage heat amount of the heat medium itself can be increased. The cold storage heat amount of the heat medium itself means the amount of stored cold heat due to its sensible heat.

By increasing the cold storage heat amount, the temperature adjustment, including cooling and heating, of the device can be performed using the cold heat storage for some period of time even though the compressor 41 is not operated, thereby saving the power of the vehicular heat management system 10.

An aspect ratio of the nanoparticle is preferably 50 or more. This is because such an aspect ratio can achieve the adequate thermal conductivity. Note that the aspect ratio of the nanoparticle is a shape index indicating the ratio of the width to the height of the nanoparticle.

Nanoparticles suitable for use include any one of Au, Ag, Cu, and C. Specifically, examples of the atom configuring the nanoparticles can include an Au nanoparticle, an Ag nanowire, a carbon nanotube (so-called CNT), a graphene, a graphite core-shell nanoparticle, an Au nanoparticle-containing CNT, and the like. The graphite core-shell nanoparticle is a particle body with the above-mentioned atom surrounded by a structure, such as a carbon nanotube.

In the refrigeration cycle 12 of the above-mentioned embodiment, a chlorofluorocarbon refrigerant is used as the refrigerant. However, the kind of refrigerant in use is not limited thereto and may be natural refrigerant, such as carbon dioxide, a hydrocarbon refrigerant, and the like.

The refrigeration cycle 12 in the above-mentioned embodiments constitutes a subcritical refrigeration cycle in which its high-pressure side refrigerant pressure does not exceed the critical pressure of the refrigerant, but may constitute a super-critical refrigeration cycle in which its high-pressure side refrigerant pressure exceeds the critical pressure of the refrigerant.

Although the present disclosure has been fully described in connection with the preferred embodiments thereof, it is to be noted that various changes and modifications will become apparent to those skilled in the art. Moreover, other combinations and configurations, including more, less or only a single element, are also within the spirit and scope of the present disclosure.

What is claimed is:

1. A vehicular heat management device comprising;
    a first heat source that heats a heat medium by a waste heat generated according to operation of the first heat source;
    a second heat source that heats the heat medium, an amount of heat generation of the second heat source being capable of being controlled as desired;
    a heater core that heats an air sent to a vehicle compartment by exchanging heat between the heat medium and the air;
    a first heat medium pathway through which the heat medium flows, the first heat source being provided in the first heat medium pathway;
    a second heat medium pathway through which the heat medium flows, the second heat source being provided in the second heat medium pathway;
    a heater core pathway through which the heat medium flows, the heater core being provided in the heater core pathway;
    a first switching valve that switches between flowing connection and flowing disconnection between the first heat medium pathway and the heater core pathway; and
    a second switching valve that switches between flowing connection and flowing disconnection between the second heat medium pathway and the heater core pathway; and
    a control unit configured to perform a switching control and a second heat source control, wherein
    the control unit selectively performs the switching control and the second heat source control to increase a temperature of the heat medium of the second heat medium pathway to be higher than a temperature of an outside air when a temperature of the heat medium of the heater core pathway is at or above a predetermined temperature,
    in the switching control, the control unit controls an operation of the second switching valve such that the second heat medium pathway communicates with the heater core pathway, and
    in the second heat source control, the control unit makes the second heat source generate heat.

2. The vehicular heat management device according to claim 1, wherein
    when:
        the first switching valve connects the first heat medium pathway to the heater core pathway; and
        the temperature of the heat medium of the heater core pathway is at or above the predetermined temperature,
    the control unit selectively performs the switching control and the second heat source control.

3. The vehicular heat management device according to claim 1, wherein
    the second heat source is a heat exchanger that exchanges heat between the heat medium and a high-pressure side refrigerant of a refrigeration cycle.

4. The vehicular heat management device according to claim 1, wherein
    the first heat source is an engine mounted on a vehicle,
    the control unit controls the operation of the first switching valve and the second switching valve such that a proportion of a flow rate of the heat medium flowing from the first heat source into the heater core to a flow rate of the heat medium flowing from the first heat source and the second heat source into the heater core increases with a change of a load of the engine from a low-load to a high-load.

5. The vehicular heat management device according to claim 1, wherein
the first heat source is an engine mounted on a vehicle,
the control unit controls the operation of the first switching valve and the second switching valve such that a proportion of a flow rate of the heat medium flowing from the second heat source into the heater core to a flow rate of the heat medium flowing from the first heat source and the second heat source into the heater core with a change of a load of the engine from a high-load to a low-load.

6. A vehicular heat management device comprising:
a first heat source that heats a heat medium by a waste heat generated according to operation of the first heat source;
a second heat source that heats the heat medium, an amount of heat generation of the second heat source being capable of being controlled as desired;
a heater core that heats an air sent to a vehicle compartment by exchanging heat between the heat medium and the air;
a first heat medium pathway through which the heat medium flows, the first heat source being provided in the first heat medium pathway;
a second heat medium pathway through which the heat medium flows, the second heat source being provided in the second heat medium pathway;
a heater core pathway through which the heat medium flows, the heater core being provided in the heater core pathway;
a first switching valve that switches between flowing connection and flowing disconnection between the first heat medium pathway and the heater core pathway; and
a second switching valve that switches between flowing connection and flowing disconnection between the second heat medium pathway and the heater core pathway; and
a control unit that controls an operation of the first switching valve such that the first heat medium pathway communicates with the heater core pathway to increase a temperature of the heat medium of the first heat medium pathway when:
a temperature of the heat medium of the heater core pathway is at or above a predetermined temperature; and
the temperature of the heat medium of the first heat medium pathway is below the predetermined temperature.

7. The vehicular heat management device according to claim 2, wherein
when:
the second switching valve connects the second heat medium pathway to the heater core pathway;
the temperature of the heat medium of the heater core pathway is at or above the predetermined temperature; and
a temperature of the heat medium of the first heat medium pathway is below the predetermined temperature,
the control unit controls the operation of the first switching valve such that the first heat medium pathway communicates with the heater core pathway.

8. A vehicular heat management device comprising:
a first heat source that heats a heat medium by a waste heat generated according to operation of the first heat source;
a second heat source that heats the heat medium, an amount of heat generation of the second heat source being capable of being controlled as desired;
a heater core that heats an air sent to a vehicle compartment by exchanging heat between the heat medium and the air;
a first heat medium pathway through which the heat medium flows, the first heat source being provided in the first heat medium pathway;
a second heat medium pathway through which the heat medium flows, the second heat source being provided in the second heat medium pathway;
a heater core pathway through which the heat medium flows, the heater core being provided in the heater core pathway;
a first switching valve that switches between flowing connection and flowing disconnection between the first heat medium pathway and the heater core pathway; and
a second switching valve that switches between flowing connection and flowing disconnection between the second heat medium pathway and the heater core pathway; and
a control unit configured to perform a switching control and a second heat source control, wherein
the control unit selectively performs the switching control and the second heat source control to increase a temperature of the heat medium of the second heat medium pathway to be higher than a temperature of an outside air when a temperature of the heat medium of the first heat medium pathway is at or above a predetermined temperature,
in the switching control, the control unit controls an operation of the first switching valve and the second switching valve such that the second heat medium pathway communicates with the first heat medium pathway, and
in the second heat source control, the control unit makes the second heat source generate heat.

9. The vehicular heat management device according to claim 8, wherein
when:
the first switching valve connects the first heat medium pathway to the heater core pathway; and
the temperature of the heat medium of the first heat medium pathway is at or above the predetermined temperature,
the control unit selectively performs the switching control and the second heat source control.

10. The vehicular heat management device according to claim 9, wherein
when:
the second switching valve connects the second heat medium pathway to the heater core pathway;
the temperature of the heat medium of the second heat medium pathway is at or above the predetermined temperature; and
the temperature of the heat medium of the first heat medium pathway is below the predetermined temperature,
the control unit controls the operation of the first switching valve and the second switching valve such that the first heat medium pathway communicates with the second heat medium pathway.

11. A vehicular heat management device comprising;
a first heat source that heats a heat medium by a waste heat generated according to operation of the first heat source;
a second heat source that heats the heat medium, an amount of heat generation of the second heat source being capable of being controlled as desired;
a heater core that heats an air sent to a vehicle compartment by exchanging heat between the heat medium and the air;
a first heat medium pathway through which the heat medium flows, the first heat source being provided in the first heat medium pathway;
a second heat medium pathway through which the heat medium flows, the second heat source being provided in the second heat medium pathway;
a heater core pathway through which the heat medium flows, the heater core being provided in the heater core pathway;
a first switching valve that switches between flowing connection and flowing disconnection between the first heat medium pathway and the heater core pathway; and
a second switching valve that switches between flowing connection and flowing disconnection between the second heat medium pathway and the heater core pathway; and
a control unit that controls an operation of the first switching valve and the second switching valve such that the first heat medium pathway communicates with the second heat medium pathway to increase a temperature of the heat medium of the first heat medium pathway when:
a temperature of the heat medium of the second heat medium pathway is at or above a predetermined temperature; and
the temperature of the heat medium of the first heat medium pathway is below the predetermined temperature.

* * * * *